(12) United States Patent  
Saxton

(10) Patent No.: US 7,494,291 B2
(45) Date of Patent: Feb. 24, 2009

(54) PORTABLE CAMERA SUPPORT

(75) Inventor: Lawrence N. Saxton, 509 Linden Ave., San Bruno, CA (US) 94066

(73) Assignee: Lawrence N. Saxton, San Bruno, CA (US)

(*) Notice: Subject to any disclaimer, the term of this patent is extended or adjusted under 35 U.S.C. 154(b) by 340 days.

(21) Appl. No.: 11/471,034

(22) Filed: Jun. 19, 2006

(65) Prior Publication Data

US 2007/0292125 A1 Dec. 20, 2007

(51) Int. Cl.
G03B 17/00 (2006.01)
F16M 11/04 (2006.01)

(52) U.S. Cl. .................. 396/420; 396/428; 248/187.1

(58) Field of Classification Search .............. 396/419, 396/420, 422, 426, 428; 248/178.1, 183.1, 248/184.1, 187.1, 205.5, 206.2, 287.1; 348/373–376, 348/378; 224/267
See application file for complete search history.

(56) References Cited

U.S. PATENT DOCUMENTS

| 4,249,817 | A | * | 2/1981 | Blau ........................ 396/428 |
| 4,377,269 | A | | 3/1983 | Sellner |
| 4,439,032 | A | | 3/1984 | Congdon |
| 4,666,112 | A | | 5/1987 | Jaumann |
| 4,733,259 | A | | 3/1988 | Ng |
| 5,081,478 | A | * | 1/1992 | Hayashida et al. .......... 396/425 |
| 5,341,185 | A | | 8/1994 | Kakatani |
| D366,887 | S | | 2/1996 | Wood |
| 5,513,784 | A | | 5/1996 | Pretorius |
| 5,649,257 | A | | 7/1997 | Kempka |
| 5,742,859 | A | | 4/1998 | Acker |
| 5,768,648 | A | | 6/1998 | Skipp |
| 6,021,984 | A | | 2/2000 | Mills |
| 6,027,258 | A | | 2/2000 | Ofria |
| 6,252,727 | B1 | | 6/2001 | Vogt |
| 6,349,905 | B1 | | 2/2002 | Mills |
| 6,434,329 | B1 | | 8/2002 | Dube et al. |
| 6,623,182 | B2 | | 9/2003 | Tatera |

(Continued)

OTHER PUBLICATIONS

"The Trekpod", http://www.redferret.net/?p=6416; *The Red Ferret Journal*, (Observed May 11, 2006),5 pgs, published Feb. 19, 2006.

(Continued)

*Primary Examiner*—W. B. Perkey
*Assistant Examiner*—Minh Phan
(74) *Attorney, Agent, or Firm*—Schwegman, Lundberg & Woessner, P.A.

(57) ABSTRACT

A portable camera support that includes a handle and a first support member attached to the handle. The first support member is attached to the handle such that the first support member rotates relative to the handle in a first plane. The portable camera support further includes a second support member that is attached to the first support member. The second support member is attached to the first support member such that the second support member rotates relative to the first support member in a second plane which is orthogonal to the first plane. The portable camera support further includes a mounting member that is adapted to be mounted to a camera. The mounting member is attached to the second support member such that the mounting member rotates relative to the second support member in a third plane which is orthogonal to the first plane and the second plane.

16 Claims, 10 Drawing Sheets

U.S. PATENT DOCUMENTS

| | | |
|---|---|---|
| 6,698,942 B2 | 3/2004 | Ward |
| 6,769,824 B2 | 8/2004 | Nakatani |
| 6,845,954 B1 | 1/2005 | Moayer et al. |
| 6,862,407 B2 * | 3/2005 | Gale .......................... 396/59 |
| 6,991,384 B1 * | 1/2006 | Davis ........................ 396/428 |
| 7,174,605 B1 * | 2/2007 | Nawrocki .................... 16/428 |
| 2002/0146249 A1 | 10/2002 | Abrose |

OTHER PUBLICATIONS

"Tripods", http://www.shortcourses.com/equipment/tripods/1-tripods.htm, (Observed May 11, 2006),15 pgs, published Apr. 21, 2006.

* cited by examiner

PORTABLE CAMERA SUPPORT

FIELD

The present invention relates to a camera support, and in particular to a portable camera support.

BACKGROUND

Photographers often use a camera support to hold a camera steady because camera movement when taking pictures can produce blurred images on the resulting photographs. Some photographers are able to keep a camera steady enough by simply hand-holding the camera. However, there are times when it is especially difficult to hold a camera steady, such as when the photograph requires a long exposure time or the camera is particularly bulky.

One common type of camera support is a tripod. A typical tripod includes a trio of support legs that serve to support a camera mounting assembly. Most camera mounting assemblies include a threaded shaft that mates with a fitting on a camera when the camera is mounted on the tripod. The threaded shaft on the camera mounting assembly and the fitting on the camera are usually formed at a standardized size to promote interchangeability between cameras and tripods.

There are some drawbacks with conventional tripods even though most tripods function well as a camera support. One of drawbacks with many tripods is that they are often large and bulky making them cumbersome to use in many situations.

In addition, smaller cameras have become increasingly popular such that there is an increased need for smaller and more portable camera supports. As examples, backpackers, climbers and travelers are among the types of photographers that typically have strict space and weight limitations.

Several types of portable camera supports have been developed in recent years. Some portable camera supports attach to a support object by using one or more clamps, straps, screws, bolts, magnets and/or adhesives.

One example type of portable camera support includes a C-clamp that has been modified to include a camera mounting assembly. Some of these C-clamp type camera supports also include a pair of short tripod legs that extend out of the body of the C-clamp.

Although portable camera supports are an improvement over full-sized tripods for some applications, many portable camera supports lack versatility and utility. As an example, many C-clamp type of portable camera supports have relatively small jaws such that they are not well suited for use with potential support objects which have diameters that are wider than the jaws of the C-clamp. In addition, it often takes a long time to adequately position the jaws of the C-clamp. Therefore, a potentially valuable picture may be missed while trying to adequately position the C-clamp.

Some portable camera supports includes brackets that are attached to a support object using a flexible binding means (e.g., a strapping material). The strapping materials are often used in conjunction with buckles, slides and or turnbuckles on the bracket depending on the type of portable camera support.

Even though the combination of a bracket and a binding means in many portable camera supports is able to adequately attach a camera to a support object (e.g., a tree or posts), many of these types of portable camera supports suffer from various drawbacks. One drawback is that many of the clamps, screws and bolts are used to permanently or semi-permanently attach the camera support to the support object. Therefore, it often takes a long time to secure (and unsecure) the portable camera support from the support object. Another drawback is that many portable camera supports are limited in size and shape such that they are not well suited for use with different types of support objects.

There are also limitations associated with using a strapping material to attach the portable camera support and/or the camera to a support object. One of these limitations is that a strapping material has a finite length so that the strapping material may not be long enough for some applications and too long for other applications. Another limitation relates to the need to maneuver the strapping material through a buckle, slide, clasp or some other article because significant manipulation is often required in order to adequately attach a camera support to a support object. In addition, the strapping material often becomes knotted as it is manipulated to attach (or remove) the camera from the support object.

SUMMARY OF THE INVENTION

The present invention relates to a portable camera support that supports a camera in any orientation. The portable camera support is readily transported by a user so that it may be taken to a variety of locations. In addition, the portable camera support may be readily grasped and/or secured to a variety of support objects.

In some embodiments, the portable camera support includes a handle and a first support member that is attached to the handle. The first support member is attached to the handle such that the first support member rotates relative to the handle in a first plane. The portable camera support further includes a second support member that is attached to the first support member. The second support member is attached to the first support member such that the second support member rotates relative to the first support member in a second plane which is orthogonal to the first plane. The portable camera support further includes a mounting member that is adapted to be mounted to a camera. The mounting member is attached to the second support member such that the mounting member rotates relative to the second support member in a third plane which is orthogonal to the first plane and is orthogonal to the second plane.

The first support member may include a first planar section and a second planar section such that the first planar section is orthogonal to the second planar section. In addition, the second support member may include a first planar section and a second planar section with the first planar section being orthogonal to the second planar section.

In some embodiments, the portable camera support includes a handle and a mounting member that is adapted to be mounted to a camera. The mounting member is attached to the handle such that the mounting member rotates relative to the handle. The handle includes finger-shaped indentations to facilitate gripping the handle. The handle may further include a concave support surface on one side of the handle while the finger-shaped indentations are on an opposing side of the handle.

The concave support surface may extend into the flat support surface such that the flat support surface is on one side of the concave support surface and on an opposing side of the concave support surface. In some embodiments, the handle includes a first recess that extends into the flat support surface on one side of the concave support surface and a second recess that extends into the flat support surface on an opposing side of the concave support surface.

The purposes and features of the present invention will be set forth in the description that follows. Additional features of the invention may be realized and attained by the product and processes particularly pointed out in the written description and claims hereof, as well as from the appended drawings.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DETAILED DESCRIPTION OF THE INVENTION

Figure 1:
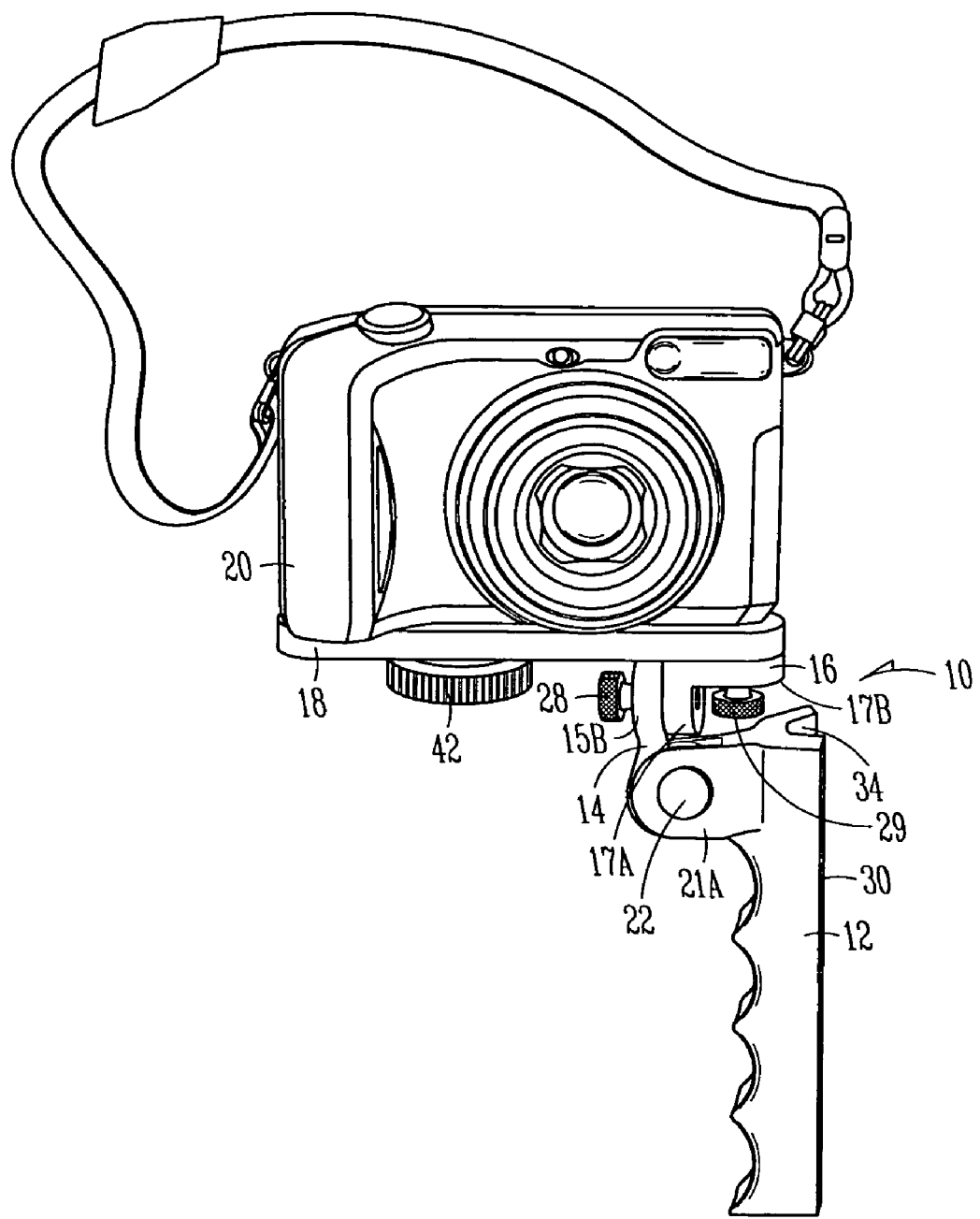
FIG. 1 is a perspective view of a camera attached to a portable camera support.

The following detailed description references the accompanying drawings which show some example embodiments of the invention. These example embodiments are described in sufficient detail to enable those skilled in the art to practice the invention. It is to be understood that other embodiments may be utilized, or structural changes made, such that the detailed description should not be considered as limiting the scope of the claims.

FIGS. 1-5 illustrate an example portable camera support 10. The portable camera support 10 includes a handle 12 and a first support member 14 that is attached to the handle 12. The first support member 14 is attached to the handle 12 such that the first support member 14 rotates relative to the handle 12 in a first plane. It should be noted that the first support member 14 may be attached to the handle 12 in any manner that permits rotation of the first support member 14 relative to the handle 12.

The portable camera support 10 further includes a second support member 16 that is attached to the first support member 14. The second support member 16 is attached to the first support member 14 such that the second support member 16 rotates relative to the first support member 14 in a second plane which is orthogonal to the first plane. It should be noted that the second support member 16 may be attached to the first support member 14 in any manner that permits rotation of the second support member 16 relative to the first support member 14.

The portable camera support 10 further includes a mounting member 18 that is adapted to be mounted to a camera 20. The mounting member 18 is attached to the second support member 16 such that the mounting member 18 rotates relative to the second support member 16 in a third plane which is orthogonal to the first plane and is orthogonal to the second plane. It should be noted that the mounting member 18 may be attached to the second support member 16 in any manner that permits rotation of the mounting member 18 relative to the second support member 16.

In the example embodiment that is illustrated in FIGS. 1-5, the handle 12 includes a pair of arms 21A, 21B such that the first support member 14 is positioned between the pair arms 21A, 21B. As shown most clearly in FIG. 3, the portable camera support 10 may further include a bolt 22 and a nut 24 that is attached to the bolt 22. The bolt extends between each arm in the pair of arms 21A, 21B and the first support member 14. The nut 24 may be attached to the bolt 22 so that the nut 24 and the bolt 22 secure the first support member 14 to the handle 12.

It should be noted that other types of fasteners beside the bolt 22 and the nut 24 may be used to secure the handle 12 to the first supporting member 14. In addition, the handle 12 may have other configurations besides the pair of arms 21A, 21B as long as the handle 12 is joined to the first support member 14 and the first support member 14 rotates relative to the handle 12 in a first plane.

Figure 3:
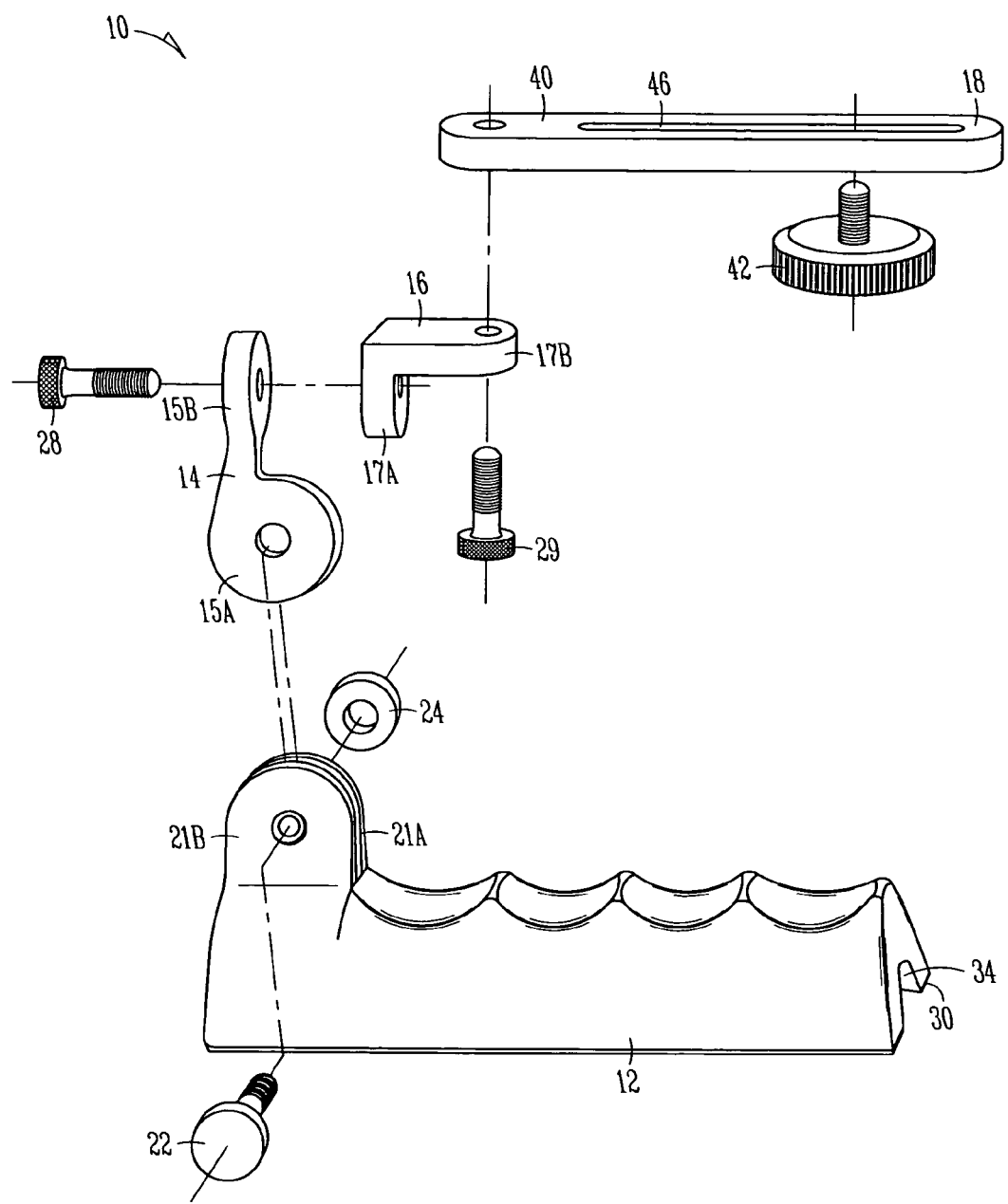
FIG. 3 is an exploded perspective view of the portable camera support shown in FIGS. 1 and 2.
Figure 4:
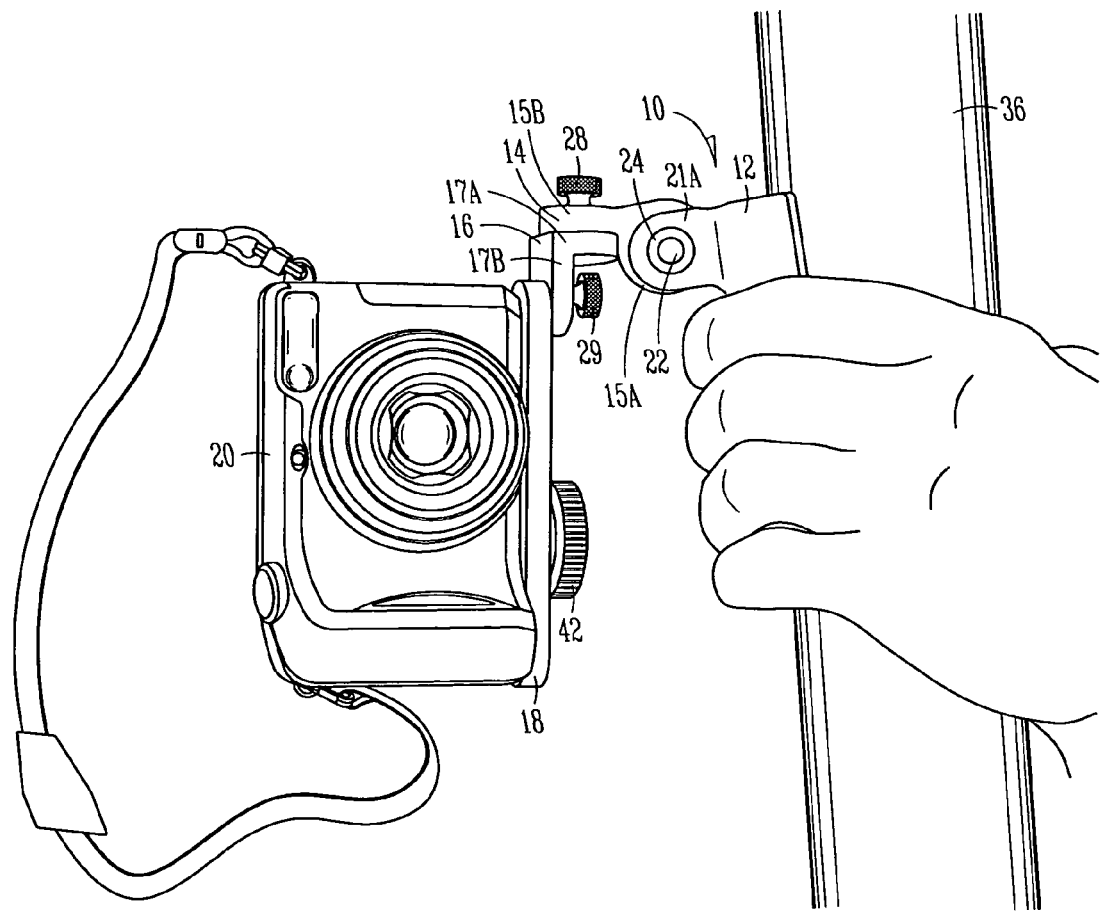
FIG. 4 is a perspective view of the camera and portable camera support shown in FIGS. 1 and 2 with the portable camera support held against a pole.
Figure 5:
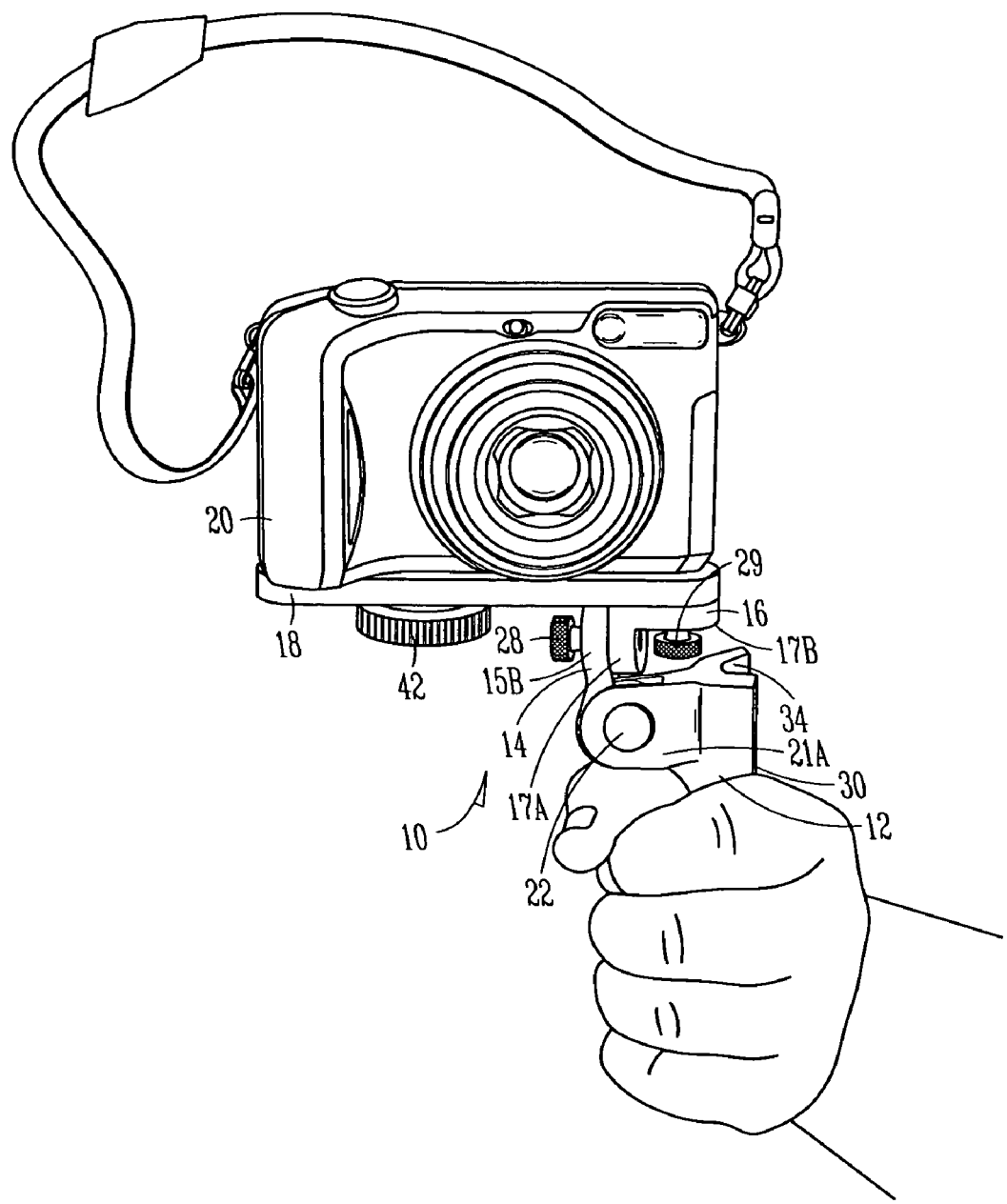
FIG. 5 is a perspective view of the camera and portable camera support shown in FIGS. 1 and 2 with the portable camera support being grasped by a hand.

As shown most clearly in FIG. 3, the first support member 14 may include a first planar section 15A and a second planar section 15B such that the first planar section 15A is orthogonal to the second planar section 15B. In addition, the second support member 16 may include a first planar section 17A and a second planar section 17B with the first planar section 17A being orthogonal to the second planar section 17B.

Although the first planar section 15A and the second planar section 15B are shown as being disc-shaped, the first planar section 15A and the second planar section 15B of the first support member 14 may be any size or shape as long as the first planar section 15A is orthogonal to the second planar section 15B. In addition, although the first planar section 17A and the second planar section 17B are shown as forming part of an angled member, the first planar section 17A and the second planar section 17B of the second support member 16 may be any size or shape as long as the first planar section 17A is orthogonal to the second planar section 17B.

In the example embodiment that is illustrated in FIGS. 1-5, a fastener 28 extends through the first support member 14 and is threaded into the second support member 16 to secure the first support member 14 to the second support member 16.

It should be noted that in other embodiments, the fastener 28 may extend through the second support member 16 and be threaded into the first support member 14 to secure the first support member 14 to the second support member 16. The fastener 28 may be any type of fastener or fastening system that is known now or discovered in the future.

Figure 2:
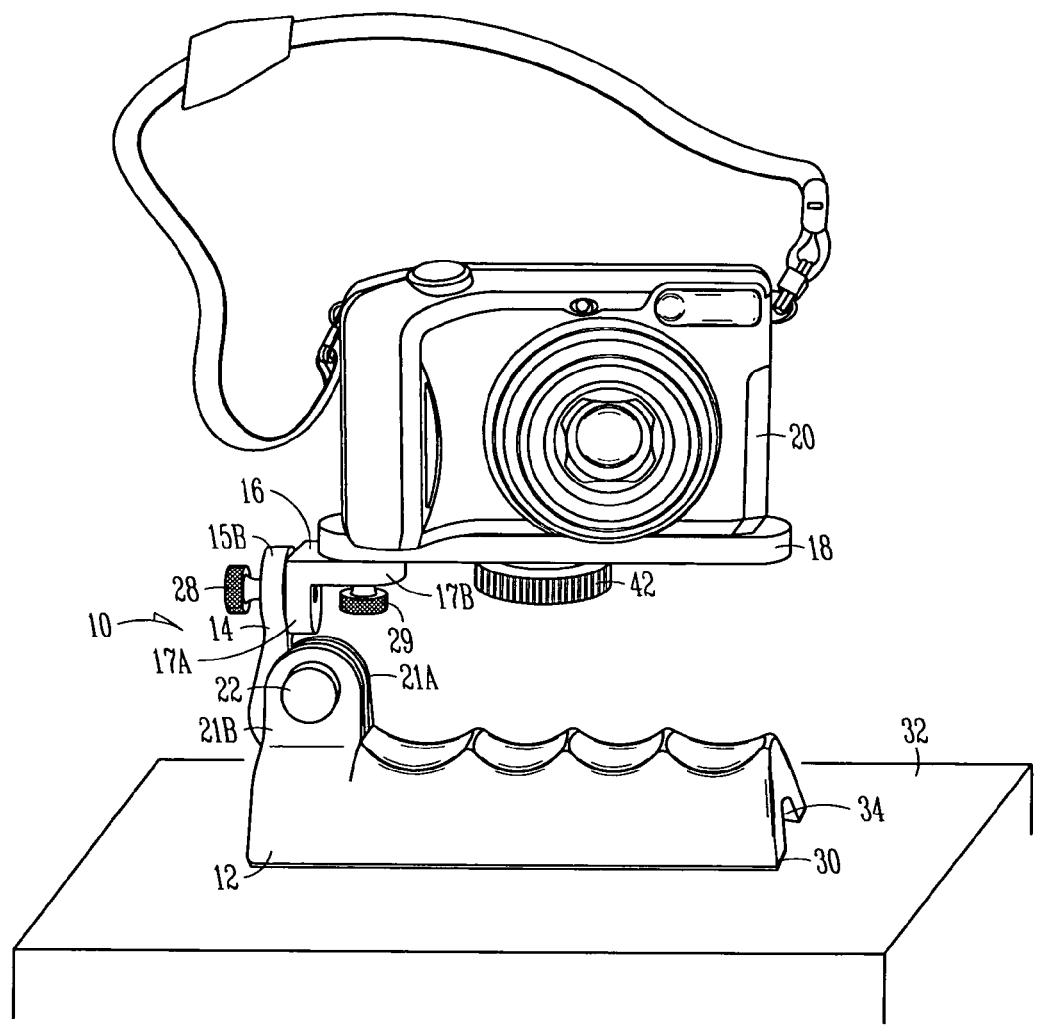
FIG. 2 is a perspective view of the camera and portable camera support shown in FIG. 1 with the portable camera support resting on a support surface.

In some embodiments, the handle 12 includes a flat surface 30 that is adapted to rest on a flat support surface 32 (see FIG. 2). In addition, the handle 12 may include a concave support surface 34 that is adapted to engage a round bracing member (see e.g., pole 36 in FIG. 4) which is able to support the camera 20. The relative sizes and shapes of the flat surface 30 and the concave support surface 32 will depend in part on the types of photographic applications where the camera 20 and the portable camera support 10 are to be used.

In the example embodiment that is illustrated in FIGS. 1-5, a fastener 29 extends through the second support member 16 and is threaded into the mounting member 18 to secure the second support member 16 to the mounting member 16.

It should be noted that in other embodiments, the fastener 29 may extend through the mounting member 18 and be threaded into the second support member 16 to secure the mounting member 18 to the second support member 16. The fastener 29 may be any type of fastener or fastening system that is known now or discovered in the future.

In some embodiments, the mounting member 18 may include a surface 40 (see FIG. 3) that is adapted to engage a portion of a camera 20. Although the surface 40 is shown as being a flat surface 40, it should be noted that the surface 40 may have any size and shape that facilitates mounting one or more types of cameras to the mounting member 18.

In addition, the portable camera support 10 may further include a fastener 42 that extends through the mounting member 18 such that the fastener 42 is adapted to secure the mounting member 18 to the camera 20. As an example, the fastener 42 may be a standardized size and shape so that the portable camera support 10 is readily used with many different types of cameras.

As shown most clearly in FIG. 3, the mounting member 18 may include a slot 46 with the fastener 42 extending through the slot 46. The slot 46 permits the camera 20 to be attached to the mounting member 18 using the fastener 42 at any location along the slot 46. The size and shape of the slot 46 will depend in part on the type of portable camera support 10.

Figure 7:
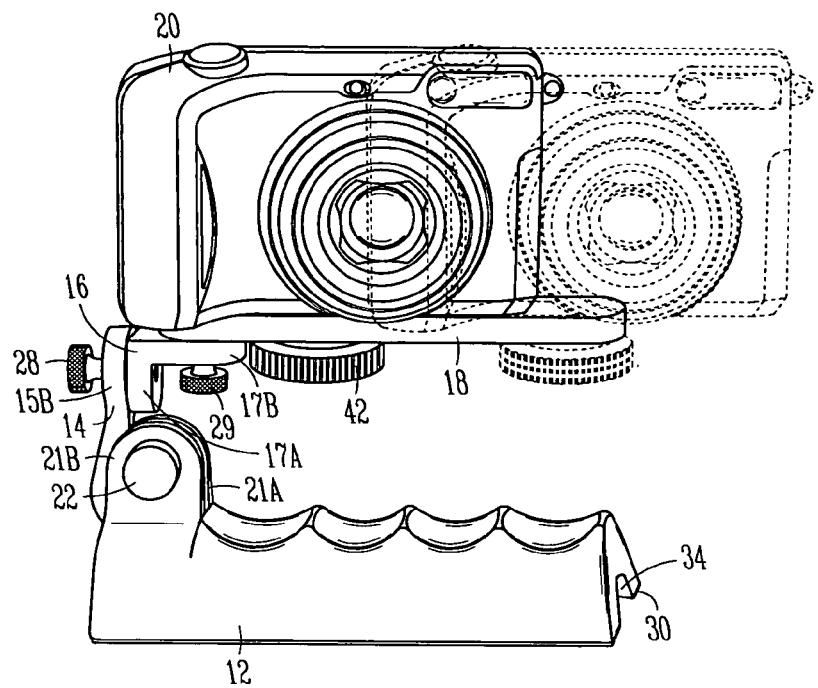
FIG. 7 is a perspective view of the camera and portable camera support shown in FIGS. 1 and 2 with the camera being moved relative to the portable camera support.

The slot 46 may facilitate using the camera 20 and the portable camera support 10 to perform 3D or stereoscopic photography. FIG. 7 shows that because the mounting member 18 includes a slot 46, the camera 20 may be moved laterally a few inches. Moving the camera 20 a few inches emulates the inter-ocular separation of the human eye.

Figure 8:
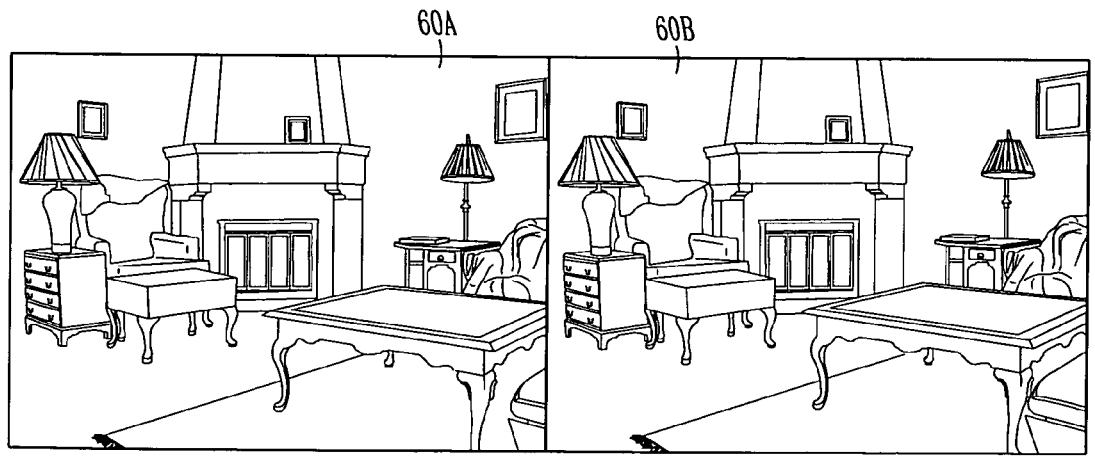
FIG. 8 shows examples photographs that may be taken using the camera when the camera is situated in the two positions shown in FIG. 7.

As shown in FIG. 8, two photographs 60A, 60B may be taken with the camera 20 from two different positions. The photographs may then be combined using conventional photographic software to provide a three dimensional effect.

Figure 6:
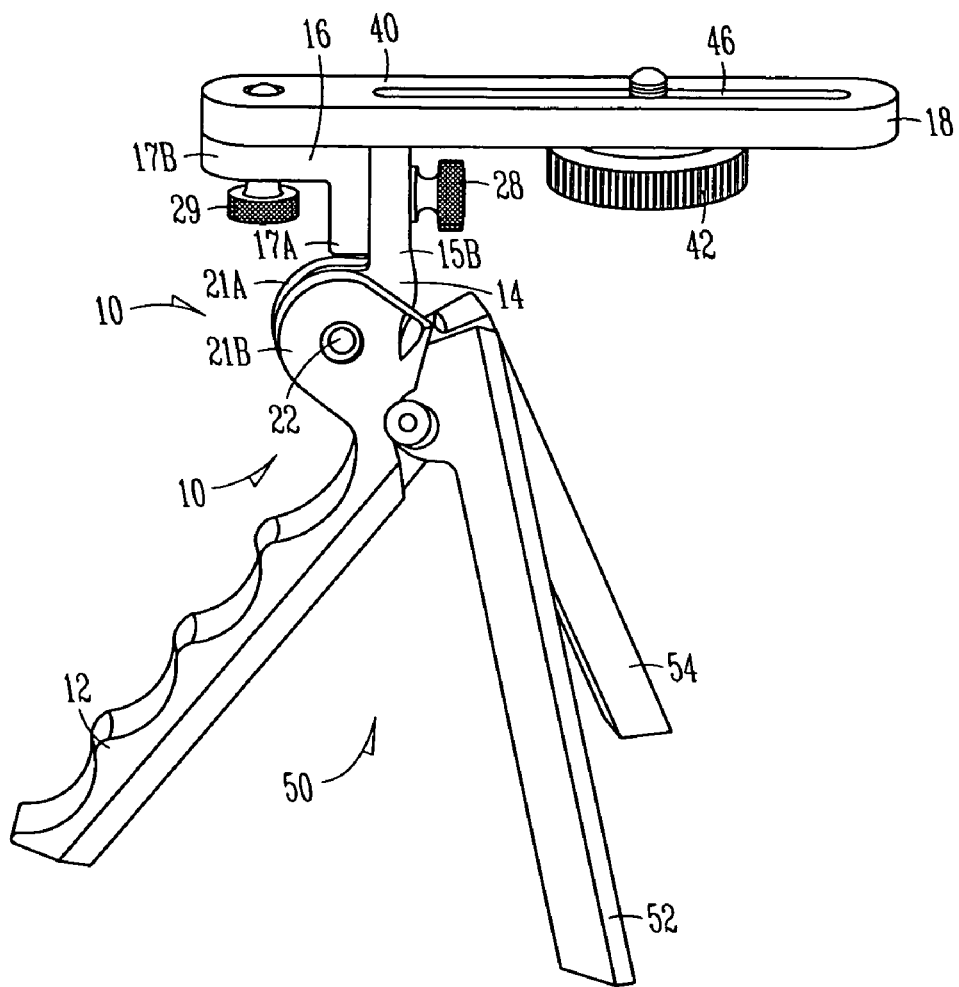
FIG. 6 is a perspective view of the portable camera support shown in FIGS. 1 and 2 with the portable camera support incorporated into a tripod.

FIG. 6 shows an example embodiment of the portable camera support 10 where the portable camera support 10 forms a tripod 50. The example portable camera support 10 that is illustrated in FIG. 6 includes a first leg 52 that is attached to the handle 12 and a second leg 54 that is attached to the handle 12. The handle 12, the first leg 52 and the second leg 54 are able to form a tripod 50 that supports the camera 20. It should be noted that the first leg 52 and the second leg 54 may be attached to the handle 12 in any manner. In addition, the relative size and length of the first leg 52 and the second leg 54 will depend in part on the type of camera 20 and the type of portable camera support 10 that is used in a photographic application.

Figure 9:
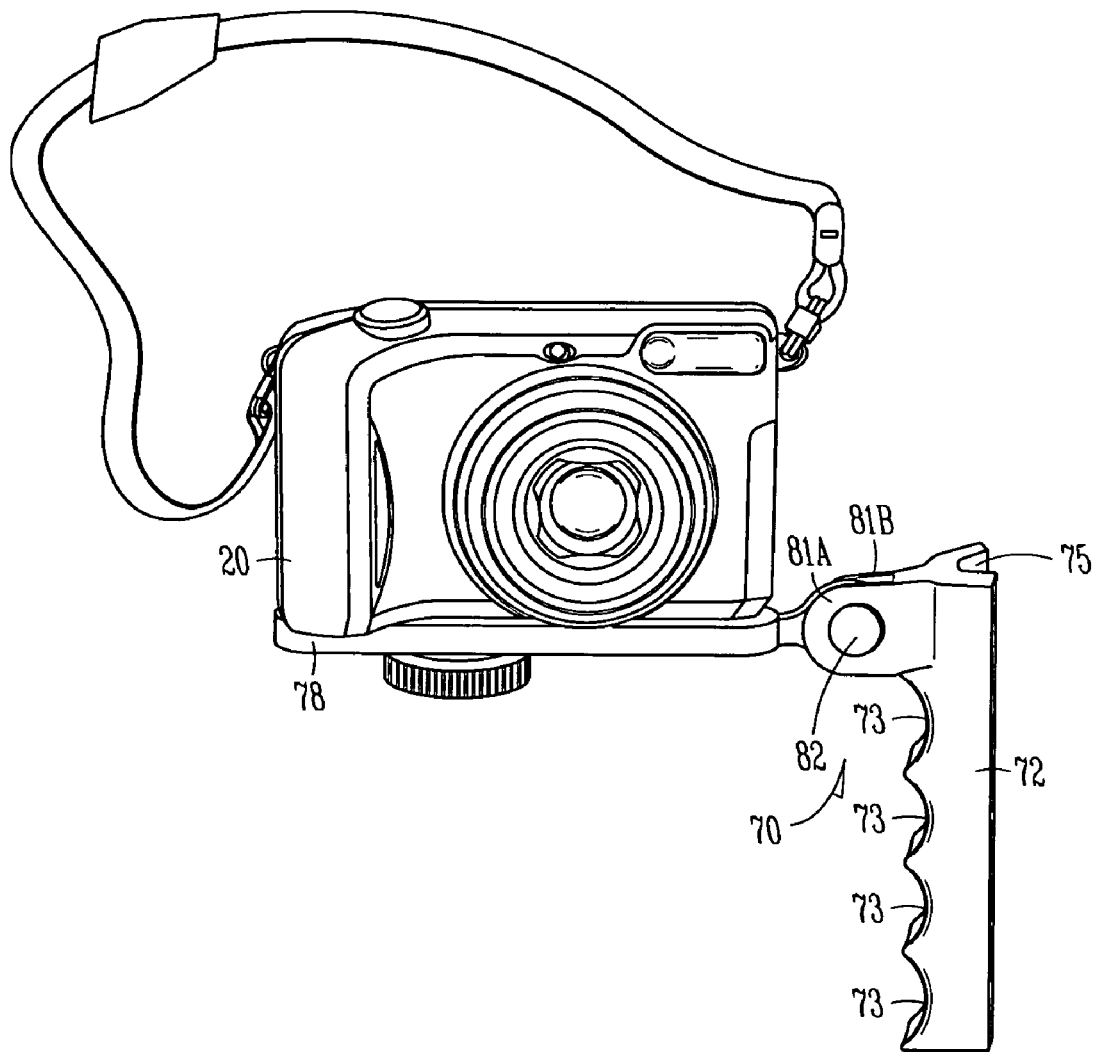
FIG. 9 is a perspective view of another portable camera support.
Figure 10:
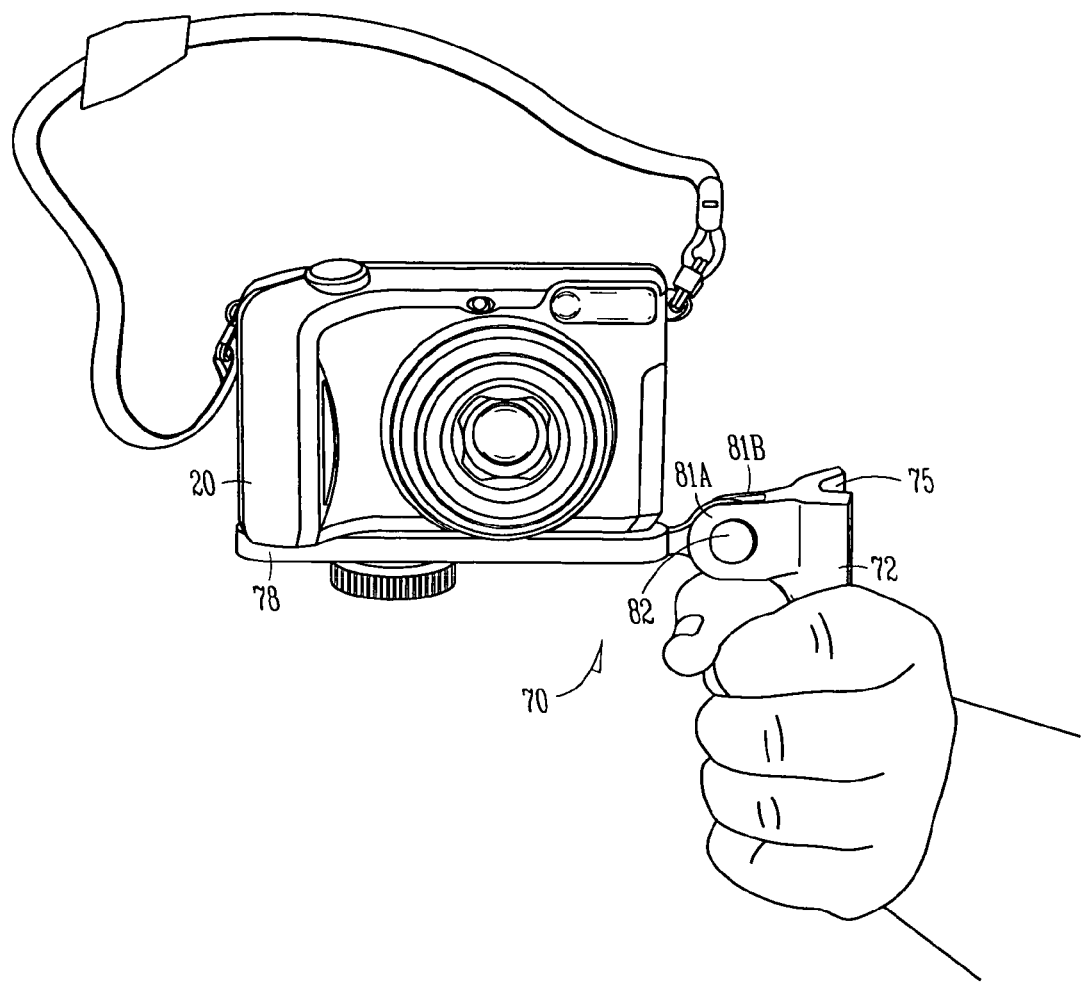
FIG. 10 is a perspective view of the portable camera support shown in FIG. 9 with the portable camera support being grasped by a hand.

FIGS. 9-10 illustrate another example portable camera support 70. The portable camera support 70 includes a handle 72 and a mounting member 78 that is adapted to be mounted to a camera 20. The mounting member 78 is attached to the handle 72 such that the mounting member 78 rotates relative to the handle 72. The handle 72 includes finger-shaped indentations 73 that facilitate gripping the handle 72. It should be noted that the mounting member 78 may be attached to the handle 72 in any manner that permits rotation of the mounting member 78 relative to the handle 72.

In some embodiments, the handle 72 may include a concave support surface 75 on one side of the handle 72 while the finger-shaped indentations 73 are on an opposing side of the handle 72. The relative size and shape of the concave support surface 75 will depend in part on the types of photographic applications where the portable camera support 70 is to be used.

Although the handle 72 is shown as including four finger-shaped indentations 73, it should be noted that other numbers of finger-shaped indentations are contemplated. In addition, each of the finger-shaped indentations 73 may be the same size and shape, or different sizes and shapes.

In the example embodiment that is illustrated in FIGS. 9-10, the handle 72 includes a pair of arms 81A, 81B such that the mounting member 78 is positioned between the pair arms 81A, 81B. It should be noted that the mounting member 78 may be attached to the handle 72 in any manner that permits rotation of the mounting member 78 relative to the handle 72.

The portable camera support 70 may further include a bolt 82 and a nut that is attached to the bolt 82 (only bolt 82 is shown in FIGS. 9 and 10). The bolt 82 extends between each arm in the pair of arms 81A, 81B and the mounting member 78. The nut may be attached to the bolt 82 so that the nut and the bolt 82 secure the mounting member 78 to the handle 72.

It should be noted that other types of fasteners besides the bolt 82 and the nut may be used to secure the handle 72 to the mounting member 78. In addition, the handle 72 may have other configurations besides the pair of arms 81A, 81B as long as the handle 72 is joined to the mounting member 78 and the mounting member 78 rotates relative to the handle 72.

Figure 11:
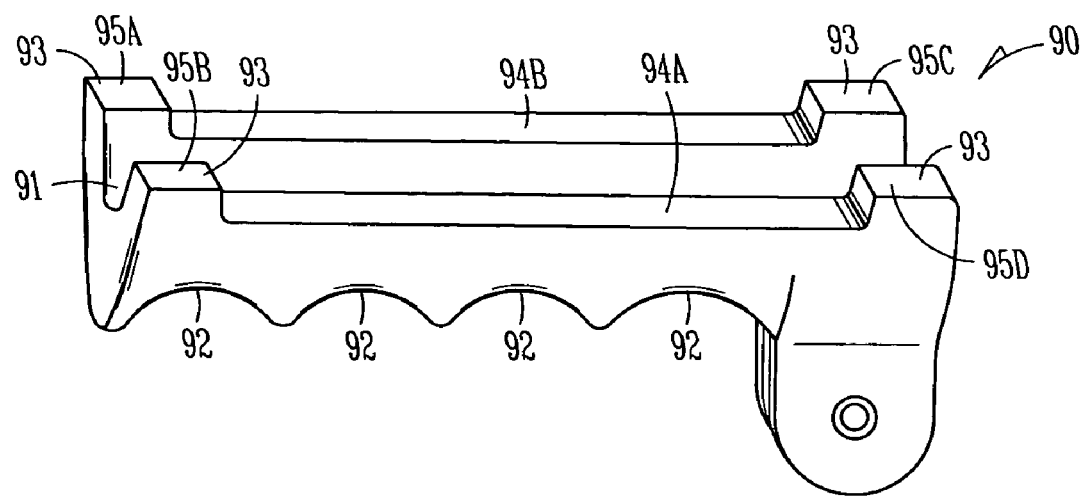
FIG. 11 is a perspective view of a handle that may be used in any of the portable camera supports described herein.

FIG. 11 is a perspective view of an example handle 90 that may be used in any of the portable camera supports described herein. The handle 90 includes a concave support surface 91 on one side of the handle 90 while the finger-shaped indentations 92 are on an opposing side of the handle 90.

The concave support surface 91 may extend into a flat support surface 93 such that the flat support surface 93 is on one side of the concave support surface 91 and on an opposing side of the concave support surface 91. The handle 90 may further include a first recess 94A that extends into the flat support surface 93 on one side of the concave support surface 91 and a second recess 94B that extends into the flat support surface 93 on an opposing side of the concave support surface 91. The combination of the recesses 94A, 94B and the concave support surface 91 in the flat support surface 93 forms four potential distinct points of contact 95A, 95B, 95C, 95D on the flat support surface 93. The four points of contact 95A, 95B, 95C, 95D may be used to engage one or more surfaces on a variety of possible support objects.

Many of the portable camera supports described herein are able to support a camera in any orientation. In addition, the portable camera supports are readily transported by a user to a variety of locations. It should be noted that some of the portable camera supports may include finger-shaped indentations which facilitate grasping the portable camera support and/or securing the portable camera support to a variety of support objects.

While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

I claim:

1. A portable camera support comprising:
   a handle;
   a first support member attached to the handle such that the first support member rotates relative to handle in a first plane;
   a second support member attached to the first support member such that the second support member rotates relative to the first support member in a second plane that is orthogonal to the first plane; and
   a mounting member that is adapted to be mounted to a camera, the mounting member being attached to the second support member such that the mounting member rotates relative to the second support member in a third plane that is orthogonal to the first plane and is orthogonal to the second plane.

2. The portable camera support of claim 1 wherein the handle includes a pair of arms such that the first support member is positioned between the pair arms.

3. The portable camera support of claim 2 further comprising:
   a bolt that extends between each arm in the pair of arms and the first support member; and
   a nut attached to the bolt so that the nut and the bolt secure the first support member to the handle.

4. The portable camera support of claim 2 wherein the first support member includes a first planar section inserted between the pair of arms and a second planar section, the first planar section being orthogonal to the second planar section.

5. The portable camera support of claim 1 further comprising a fastener that extends through at least one of the first support member and the second support member and is threaded into the other of the first support member and the second support member to secure the first support member to the second support member.

6. The portable camera support of claim 1 wherein the second support member includes a first planar section and a second planar section, the first planar section being orthogonal to the second planar section.

7. The portable camera support of claim 1 further comprising a fastener that extends through at least one of the mounting member and the second support member and is threaded into the other of the mounting member and the second support member to secure the mounting member to the second support member.

8. The portable camera support of claim 1 wherein the handle includes a flat surface that is adapted to rest on a flat support surface.

9. The portable camera support of claim 1 wherein the handle includes a concave support surface that is adapted to engage a round support member.

10. A portable camera support comprising:
    a handle that includes finger-shaped indentations to facilitate gripping the handle, wherein the handle includes a flat support surface and a concave support surface that extends into the flat support surface such that the flat support surface is on one side of the concave support surface and on an opposing side of the concave support surface; and
    a mounting member that is adapted to be mounted to a camera, the mounting member being attached to the handle such that the mounting member rotates relative to the handle.

11. The portable camera support of claim 10 wherein the handle includes a first recess that extends into the flat support surface on one side of the concave support surface and a second recess that extends into the flat support surface on an opposing side of the concave support surface.

12. The portable camera support of claim 10 wherein the concave support surface is on one side of the handle and the finger-shaped indentations are on an opposing side of the handle.

13. The portable camera support of claim 10 wherein the handle includes a pair of arms such that the mounting member is positioned between the pair of arms.

14. The portable camera support of claim 13 further comprising:
    a bolt that extends between each arm in the pair of arms and the mounting member; and
    a nut attached to the bolt so that the nut and the bolt secure the mounting member to the handle.

15. The camera support of claim 14 wherein the handle includes four finger-shaped indentations.

16. The camera support of claim 10 wherein each of the finger-shaped indentations is the same size and shape.

* * * * *